(12) United States Patent
Tsuda (10) Patent No.: US 9,249,826 B2
(45) Date of Patent: Feb. 2, 2016

(54) INNER CABLE FOR OPERATION

(75) Inventor: Akira Tsuda, Hyogo (JP)

(73) Assignee: Hi-Lex Corporation, Hyogo (JP)

( * ) Notice: Subject to any disclaimer, the term of this patent is extended or adjusted under 35 U.S.C. 154(b) by 887 days.

(21) Appl. No.: 11/908,135

(22) PCT Filed: Mar. 8, 2006

(86) PCT No.: PCT/JP2006/304454
§ 371 (c)(1),
(2), (4) Date: Sep. 10, 2007

(87) PCT Pub. No.: WO2006/095765
PCT Pub. Date: Sep. 14, 2006

(65) Prior Publication Data
US 2009/0042052 A1 Feb. 12, 2009

(30) Foreign Application Priority Data

Mar. 11, 2005 (JP) .................................. 2005-069949
Feb. 21, 2006 (JP) .................................. 2006-043227

(51) Int. Cl.
*D07B 1/00* (2006.01)
*D07B 5/00* (2006.01)
(Continued)

(52) U.S. Cl.
CPC ............... *F16C 1/20* (2013.01); *D07B 1/0673* (2013.01); *Y10T 428/12333* (2015.01)

(58) Field of Classification Search
CPC ............... D07B 2201/2036; D07B 2201/2024; D07B 2201/102; D07B 2201/1032; D07B 2201/2011; D07B 2201/2061; D07B 2801/24; D07B 2205/306; D07B 2801/18; D07B 2205/3071; D07B 2205/3092; D07B 1/025; D07B 1/162; D07B 1/22; D07B 2201/1008; D07B 2205/2042; D07B 2501/2007; D07B 2205/205; D07B 2801/10; D07B 2205/3206; B66B 7/06; B66B 7/062

USPC ............ 428/364; 49/352, 348, 349, 374, 324, 49/338, 347; 57/211, 212, 213, 216, 218, 57/222, 223, 210, 214, 206, 231
See application file for complete search history.

(56) References Cited

U.S. PATENT DOCUMENTS 2,860,873 A * 11/1958 Miles, Jr. ..................... 74/89.21
3,996,020 A * 12/1976 Hosoya ........................ 428/592
(Continued)

FOREIGN PATENT DOCUMENTS

JP          5272083 A    10/1993
JP           687047 A     3/1994
(Continued)

OTHER PUBLICATIONS

All of Wire Ropes (I)—Road to Safety; Dec 25, 1993; (partial translation) p. 124-125, 127, 149-150, 240-241.
(Continued)

*Primary Examiner* — Jennifer Chriss
*Assistant Examiner* — Altrev Sykes
(74) *Attorney, Agent, or Firm* — Harness, Dickey & Pierce, PLC (57) ABSTRACT

A cable for operation with a complex stranded construction may include a core strand stranded with a plurality of element wires and a plurality of side strands on which a plurality of element wires are respectively stranded are stranded. A tightening percentage may be 4 to 11%. The pre-forming percentage may be 65 to 90%. The stranding length of the inner cable for operation is 9 to 18-fold against the outer diameter of the inner cable for operation and an angle of the element wires composing the side strand appearing at the outermost lay against an axis line of the inner cable is −3 degrees to 3 degrees.

5 Claims, 5 Drawing Sheets

(51) Int. Cl.
  *F16C 1/20* (2006.01)
  *D07B 1/06* (2006.01)

(56) References Cited

U.S. PATENT DOCUMENTS

| | | | | |
|---|---|---|---|---|
| 4,827,708 | A | * | 5/1989 | Verreet ............................ 57/212 |
| 5,475,973 | A | * | 12/1995 | Furukawa et al. ............... 57/232 |
| 6,339,920 | B1 | * | 1/2002 | Yokoyama ....................... 57/210 |
| 6,363,704 | B2 | * | 4/2002 | Kim ................................. 57/216 |
| 2006/0174604 | A1 | * | 8/2006 | Vanderbeken et al. .......... 57/217 |

FOREIGN PATENT DOCUMENTS

| | | |
|---|---|---|
| JP | 2000129585 A | 5/2000 |
| JP | 200339152 A | 6/2002 |

OTHER PUBLICATIONS

Wire Ropes for Aircraft Control; JIS G 3535-JIS G 3540; (partial translation) p. 1463-1464, 1490-1491.

Wire Ropes for Mechanical Control; JIS G 3540; translation-in-part; "Attachment A".

\* cited by examiner

INNER CABLE FOR OPERATION

FIELD

The present invention relates to an inner cable for operation. More specifically, the present invention relates to an operational inner cable having hardly rotating property in which the stranding length of an inner cable is 9 to 18-fold against the outer diameter of the inner cable and a strand at the outermost lay is ordinary lay.

BACKGROUND

When a conventional inner cable having little tightening percentage and large pre-forming percentage, an inner cable with loose strand is used at a site such as a non rotating guiding device where the inner cable is bent while sliding, shape is easily lost by the tightening percentage and pre-forming percentage and as a result, an element wire is subjected to local bending which is caused by pressuring the element wire on an element wire lay underneath by the secondary bending and external pressure; therefore there has been a problem that the durability of bending fatigue is low.

In an invention described in Japanese Patent Publication No. 2669754, there is proposed an inner cable for operation (hereinafter, referred merely as an inner cable) with a stranded construction which is constituted by stranding a core strand stranding a plurality of element wires with a plurality of side strands in which a plurality of element wires are stranded around the core strand, wherein the tightening percentage which is represented by the percentage of a value which is obtained by dividing a value obtained by subtracting a measured outer diameter being the diameter of the circumscribed circle of the inner cable for operation from a calculated outer diameter being the total sum of the inner cable for operation to a diameter direction of the respective outer diameters of the plurality of element wires, by the measured outer diameter is 4 to 11% and the pre-forming percentage of the side strand which is represented by the percentage of a value which is obtained by dividing the undulating diameter of the side strands when the inner cable is sleeved, by the measured outer diameter of the inner cable is 65 to 90%.

The inner cable described in Japanese Patent Publication No. 2669754 is hardly stranded by enlarging the tightening percentage than a conventional inner cable, deformation can be prevented and as a result, the secondary bending of element wires hardly occurs. Since force going to shrink to the central direction of the inner cable is applied to the side strand of the stranded inner cable, deformation can be prevented, effect that the secondary bending of element wires occurs hardly is obtained and the durability of bending fatigue at a sliding portion is improved.

Figure 1:
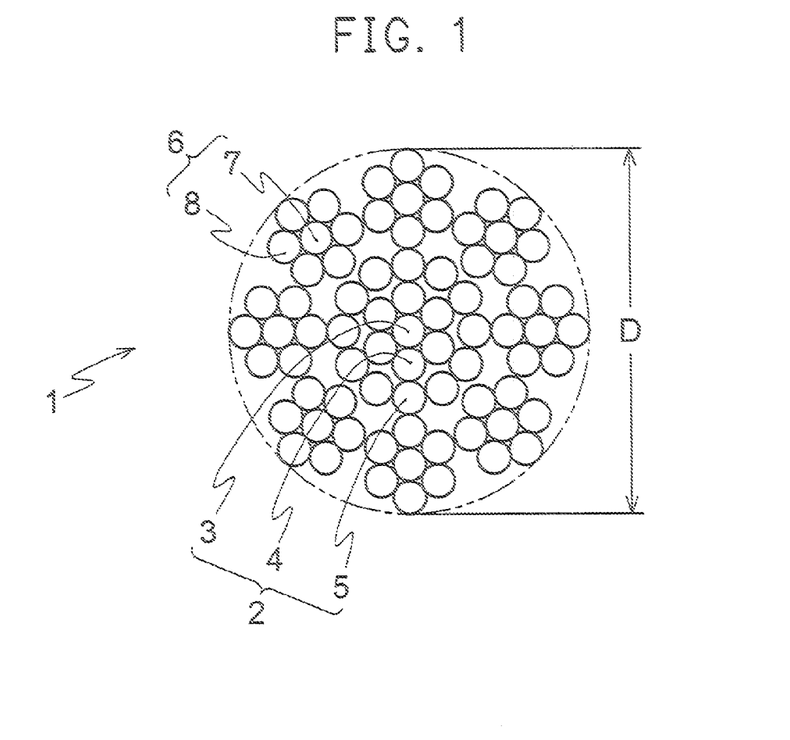
FIG. 1 is a sectional illustration diagram showing one Embodiment of an inner cable of the present invention.

FIG. 1 shows one example of the inner cable described in Japanese Patent Publication No. 2669754. The inner cable 1 shown in FIG. 1 is a so-called construction of 19+8×7. Wherein 19+8×7 is that one core strand 2 is composed by stranding 6 of the first side element wires 4 around one core element wire 3 and stranding 12 of the second side element wires 5 therearound, a side strand 6 is composed by stranding 6 of side element wires 8 around one core element wire 7, and 8 of the side strands 6 are stranded around the core strand 2 to prepare the inner cable 1. The core strand is a so-called cross lay construction and the first element wire is brought in a point contact with the second element wire.

Further, the tightening percentage of the present inner cable 1 is a range of 4 to 11% and the pre-forming percentage is a range of 65 to 90%.

The reason why the tightening percentage is a range of 4 to 11% is that when the tightening percentage exceeds 11%, element wires are hardly stranded and there are problems that wires are broken by excessive tightening or the surface of element wires is damaged in production. On the other hand, when the tightening percentage is lessened than 4%, durability subject to bending while sliding is inadequate, as will become clear from the from illustration by following Examples.

On the other hand, it is according to the following reason that the pre-forming percentage is set at a range of 65 to 90%. Namely, when the pre-forming percentage exceeds 90%, force going to shrink to the central direction of the inner cable is not applied to the side strand so much and secondary bending easily occurs when an inner cable similar to a non-rotating guiding device is used at a site where it is bent while sliding. Further, as will become clear from the illustrations of Examples and Comparative Examples described later, durability is lowered. On the other hand, the side strand is entangled at breaking in case of an inner cable having a pre-forming percentage of 65% or less, therefore it cannot be used.

Figure 2:
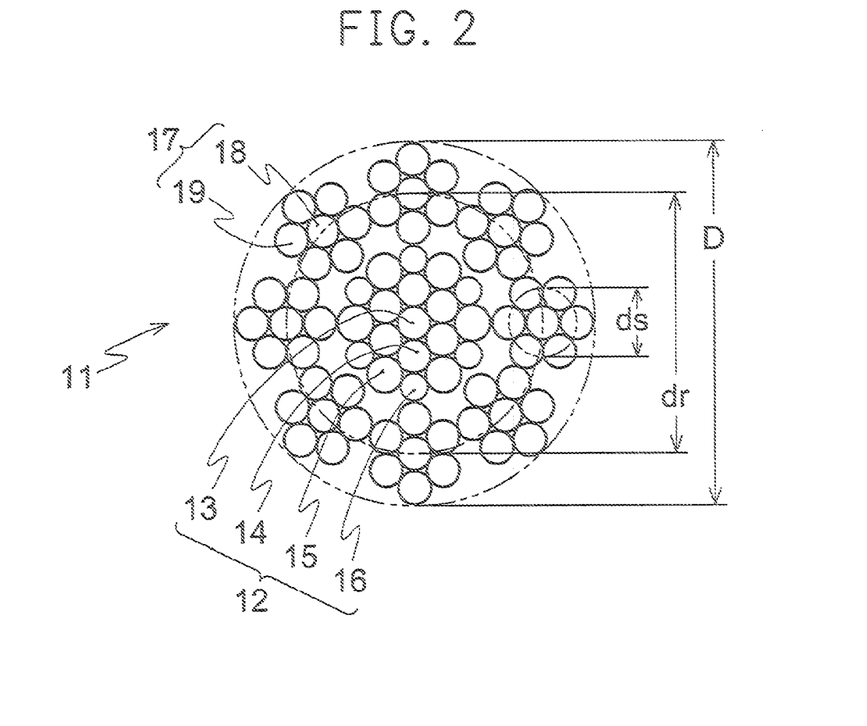
FIG. 2 is a sectional illustration diagram showing another Embodiment of the inner cable of the present invention.

The inner cable 11 as shown in FIG. 2 is another example of the inner cable of the invention described in Japanese Patent Publication No. 2669754. The inner cable 11 is those in which the core strand 12 is stranded in parallel lay strand (also called as line contact strand). The parallel lay strand is a strand type in which element wires with different outer diameters are combined and the strand pitch and strand direction of respective lays are the same. Since outer lay element wires are fitted in the groove portions between inner lay element wires, respective element wires are not crossed and essentially in line contact. As a result, the tightening of strand is good and shape loss hardly occurs. Further, it shows superior characteristics that the internal friction (friction by mutual element wires) of a strand is little and fatigue by the secondary bending is not generated.

The inner cable 11 of FIG. 2 has a W (19)+8×7 construction using the core strand 12 having a Warrington type construction within a parallel strand+8×7 construction. The Warrington type is that difference between the maximum diameter of element wires and the minimum diameter of element wires is the least and suitable for a strand with a narrow diameter in 19 of parallel lay stands.

Specifically, 6 of the first side element wires 14 with a slightly narrower diameter than the core element wire 13 are provided around one core element wire 13, 6 of the third side element wires 15 having the same diameter as the core element wire 13 are provided between the mutual first side element wires 14, 6 of the second side element wires 16 with a further narrower diameter than the first side element wires 14 are provided on an upper lay along the first side element wires 14, and these side element wires 14, 15 and 16 are simultaneously stranded at the same pitch and to the same direction to form the core strand 12. It should be noted that the diameters of the respective element wires of the core strand are not limited to the above-description. After all, when respective element wires are stranded at the same pitch and to the same direction, the diameter of element wires may be suitably selected so that respective element wires are mutually brought in line contact.

Further, 8 of the side strands 17 are strands in which 6 of side element wires 19 are stranded around the core element wire 18. For the inner cable 11, the tightening percentage is also 4 to 11% and the pre-forming percentage is 65 to 90%.

Figure 3:
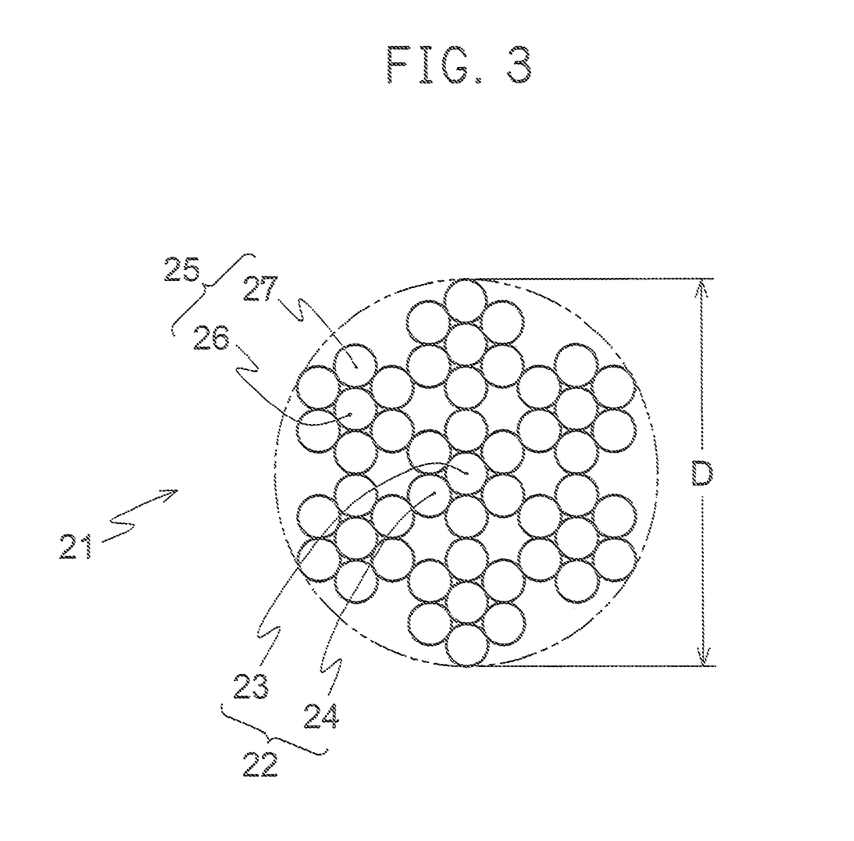
FIG. 3 is a sectional illustration diagram showing further another Embodiment of the inner cable of the present invention.

Further, another example of the inner cable described in Japanese Patent Publication No. 2669754 is shown in FIG. 3.

For the inner cable 21, the tightening percentage is also 4 to 11% and the pre-forming percentage is 65 to 90%, and it has a 7×7 construction. Namely, the core strand 22 is a strand in which 6 of the side element wires 24 is stranded around one core element wire 23. Further, the side strand 25 stranded around the core strand 22 is a strand in which 6 of the side element wires is stranded 27 around one core element wire 26, in the same manner as the core strand 22.

Since the tightening percentage is 4 to 11% and the pre-forming percentage is 65 to 90% for the inner cable described in Japanese Patent Publication No. 2669754, the durability of bending fatigue is not lowered even if it is used at a site sliding such as a guide device. Consequently, the inner cable described in Japanese Patent Publication No. 2669754 is used, for example, for a control cable for a window regulator of an automobile and the like.

However, when the inner cable described in Japanese Patent Publication No. 2669754 is used for the control cable for a window regulator of an automobile, there is a problem that abnormal noise is generated in accordance with the friction of the cable guide with the inner cable.

The present inventors have studied the cause of the abnormal noise and as a result, have found that the stranded trace of the inner cable is transcribed on the cable guide at a process of use, and stranded unevenness is formed. As a result, when the inner cable slides on the cable guide, rotational force works on the inner cable at sliding on the stranded unevenness to twist the inner cable and the twisting of the inner cable is released and hits the cable guide plane to generate abnormal noise.

It is described in "All of Wire Ropes (II)" edited by Steelmaking Activation Study Group of the Kaizuka Chamber of Commerce and Industry, published by the Kaizuka Chamber of Commerce and Industry, Jul. 25, 1995, pages 45 to 59 that the property of rotation centering on the axis of an inner cable means the rotation of the inner cable, the rotation of the inner cable includes rotation based on tension, rotation based on contact and rotation based on bending, and the rotation based on contact among these occurs by rotation caused by movement to a spiral direction when the inner cable is brought in contact with a sieve because grooves between strands are spiral on the surface of the inner cable because of stranding.

Figure 4A:
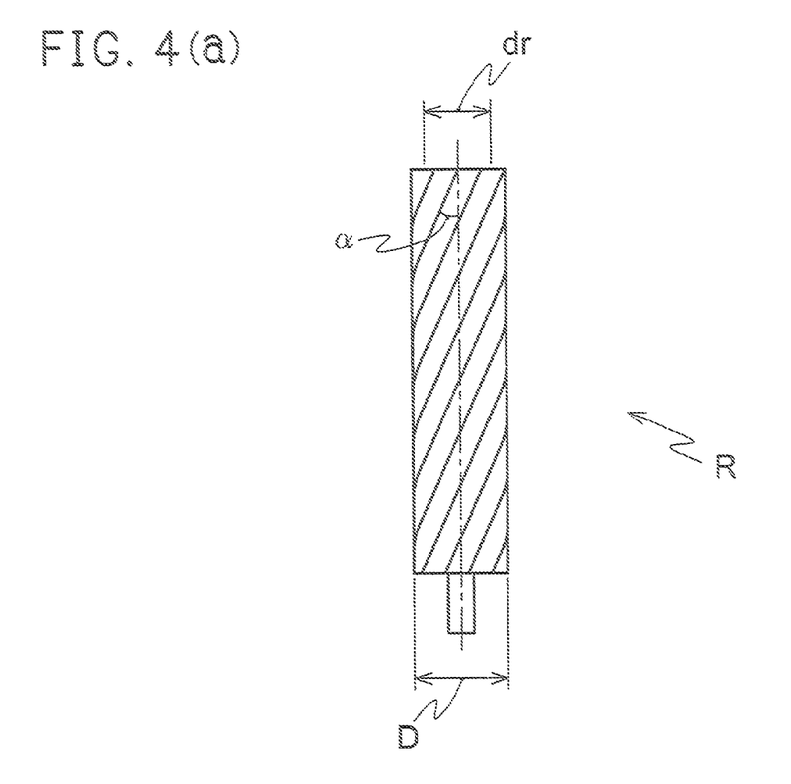
FIG. 4 is an illustration diagram showing a relation between the stranding angle of an inner cable and a stranding length (inner cable pitch)
Figure 4B:
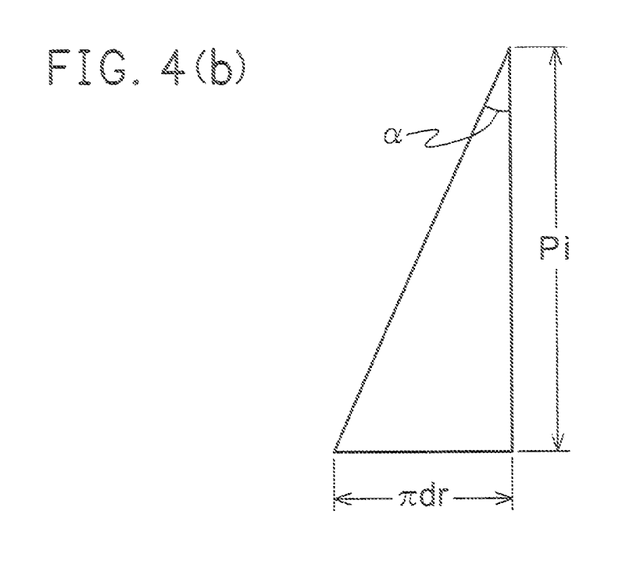

Further, relation between the stranded angle of an inner cable and a stranding length (inner cable pitch) is as shown in FIG. 4 and is represented by the following formula (1).

$$\tan \alpha = dr \cdot \pi / Pi \quad (1)$$

Wherein α is the stranded angle of an inner cable, Pi is a stranding length (pitch) and dr is a lay core diameter of an inner cable.

Further, according to "All of Wire Ropes (II)" edited by Steelmaking Activation Study Group of the Kaizuka Chamber of Commerce and Industry, published by the Kaizuka Chamber of Commerce and Industry, Jul. 25, 1995, pages 45 to 49, an inner cable in which the compensating relation of stranded return torque is improved in comparison with a rotating inner cable by elongating the stranding length of a strand in comparison with the inner cable of six rotating strands in the composition of six normal stranded strand inner cables is generally called as a long pitch inner cable or a hardly rotating inner cable.

The purpose of the invention of Japanese Unexamined Patent Publication No. 228277/1997 is to provide a hardly rotating complex lay stranded inner cable in which the de-stranding resistance of steel core at loading, the hooking force of an outer lay strand and the like are enhanced by composing with both inner lay strands with a normal stranded construction alternately disposing steel cores and the Lang lay construction, the rotation, shape loss and the like of the whole inner cable are effectively reduced, and steel cores can be used for both inner cables with a normal stranded construction and the Lang lay construction to improve the hardly rotating property, shape loss resistance, durability and the like and to reduce cost. In a complex lay stranded inner cable which is stranded by a plurality of outer lay strands on a steel core which is stranded by a plurality of inner strands, an inner strand formed to Z side and an inner strand formed to S side are alternately disposed to be stranded in the same direction to form steel cores equipped with the inner strand with a normal stranded construction and the inner strand with the Lang lay construction which are alternately disposed. A plurality of outer lay strands are stranded to the same direction in a normal stranded construction or the Lang lay construction such that the de-stranding resistance of steel core at loading, the hooking force of an outer lay strand and the like are enhanced by both inner lay strands with a normal stranded construction alternately disposed and the Lang lay construction, the rotation, shape loss and the like of the whole inner cable are effectively reduced together with the steel cores. Thereby steel cores can be used for both inner cable having a normal stranded construction and the Lang lay construction such that the hardly rotating property, shape loss resistance, durability and the like are improved and cost reduction can be carried out.

An object of the invention in Japanese Unexamined Patent Publication No. 295187/2001 is to remarkably reduce the damage of element wires in comparison with a conventional strand inner cable and to suppress the generation of sound between element wires caused by friction. In order to solve the problem, in a strand inner cable in which a plurality of element wires are stranded to form a core strand and a plurality of side strands which are formed by stranding a plurality of element wires around the core strand are stranded, element wires drawing spiral by stranding among element wires composing the core strand and element wires drawing spiral by stranding among element wires composing the side strands are entirely formed in the same length.

The invention described in Japanese Unexamined Patent Publication No. 295187/2001 found out that the difference in the length of element wires affects wear resistance and sound generated between respective element wires, and the concentration of stress applied to respective element wires is mitigated by equalizing the length of element wires. Therefore wear resistance is improved and the generation of sound generated between respective element wires is suppressed.

SUMMARY

With respect to the inner cable 1 of FIG. 1, a rotation coefficient k of the inner cable 1 is 0.105255, a stranding length of the inner cable is 11.7 and a stranding length of the side strand 6 is 5.2. The rotation coefficient k of the inner cable 11 of FIG. 2 is 0.100665, the stranding length of the inner cable 11 is 12.7 and the stranding length of the side strand 17 is 5.2. The rotation coefficient k of the inner cable 21 of FIG. 3 is 0.089439, the stranding length of the inner cable 21 is 11.3 and the stranding length of the side strand 25 is 5.5.

According to "All of Wire Ropes (II)" edited by Steelmaking Activation Study Group of the Kaizuka Chamber of Commerce and Industry, published by the Kaizuka Chamber of Commerce and Industry, Jul. 25, 1995, pages 45 to 49, since it is described that the torque coefficient k of the rotating inner cable satisfies the relation of k>0.08, the rotation coefficient k of the hardly rotating inner cable satisfies the relation of 0.065>k>0.045 and the rotation coefficient k of the non rotating inner cable satisfies the relation of 0.03>k, the torque coefficient k satisfies the relation of k>0.08 for any one of the inner cables of FIGS. 1, 2 and 3 in the cited Reference 1, and it is grasped that it has rotating property.

It is an object of the present invention to provide an inner cable that keeps durability and has hardly rotating property with respect to the inner cables FIGS. 1 to 3.

The inner cable related to a first Embodiment of the present invention is an inner cable for operation with a complex stranded construction composed by a core strand stranded with a plurality of element wires and a plurality of side strands on which a plurality of element wires are respectively stranded are stranded, characterized in that a tightening percentage which is represented by the percentage of a value which is obtained by dividing a value obtained by subtracting a measured outer diameter being the diameter of the circumscribed circle of the inner cable for operation from a calculated outer diameter being the total sum of the inner cable for operation to a diameter direction of the respective outer diameters of a plurality of element wires, by the measured outer diameter is 4 to 11% and a pre-forming percentage of the side strand which is represented by the percentage of a value which is obtained by dividing the undulating diameter of the side strands when the inner cable is sleeved, by the measured outer diameter of the inner cable is 65 to 90%, and the stranding length of the inner cable for operation is 9 to 18-fold against the outer diameter of the inner cable for operation and an angle of the element wires composing the side strand appearing at the outermost lay against an axis line of the inner cable is $-3$ degrees to 3 degrees.

Further, the stranded construction may be a 19+8×7 construction.

Further, the core strand or side strand may be stranded by parallel stranding.

Further, the stranded construction may be parallel strand+ 8×7 construction.

A second Embodiment of the present invention is a window regulator provided with the inner cable for operation.

DETAILED DESCRIPTION

According to "All of Wire Ropes (II)" edited by Steelmaking Activation Study Group of the Kaizuka Chamber of Commerce and Industry, published by the Kaizuka Chamber of Commerce and Industry, Jul. 25, 1995, pages 45 to 49, the rotation coefficient k of the inner cable is obtained by the following formula (2). Namely, $$k = TR/(P \times D) \quad (2)$$

Wherein TR is the rotation torque (N·m) of an inner cable, P is tension (N) acting on an inner cable and D is an outer diameter (mm) of an inner cable.

The rotation torque TR of an inner cable can be determined by TR=Tr−ΣTs·cosα. Wherein Tr is de-stranding torque generated in an inner cable, ΣTs is the rotation torque of a side strand, ΣTs·cosα is the rotation torque of a side strand using an inner cable and α is the stranding angle of an inner cable (refer to FIG. 4).

The inner cable torque (namely, de-stranding torque generated in an inner cable) Tr can be determined by Tr=(P·tanα)·(dr/2). Wherein P is tension applied to an inner cable, dr is a layer core diameter and α is a stranding angle of an inner cable.

When the outer diameter of an inner cable, the layer core diameter of a side strand ds and the layer core diameter of an inner cable dr are the same as the inner cable 1 of the cited Reference 1 with respect to the inner cables 1, 11 and 21 of FIGS. 1 to 3, the stranding length of the side strands 6, 17, 25 are substantially the same as the inner cable of the cited Reference 1 and only the stranding length of an inner cable is longer than that of the cited Reference 1 (namely, 9 to 18-fold of the outer diameter of the inner cables 1, 11 and 21), then a torque coefficient k satisfies the relation of 0.065>k>0.045.

Figure 5A:
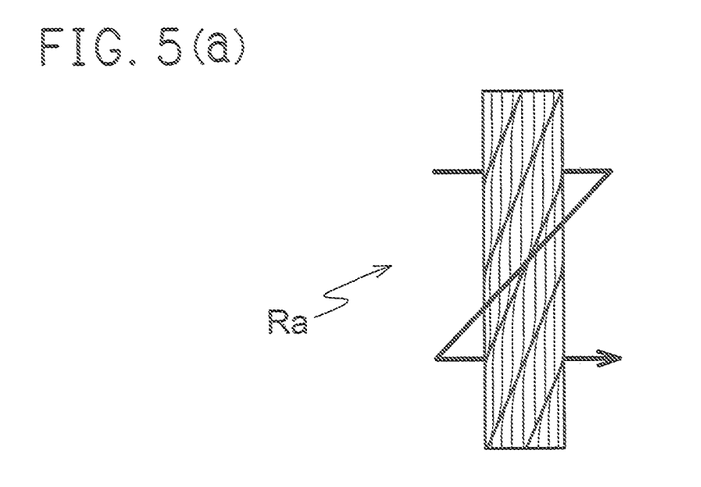
FIG. 5 is an illustration diagram showing a stranding direction of an inner cable of the present invention.
Figure 5B:
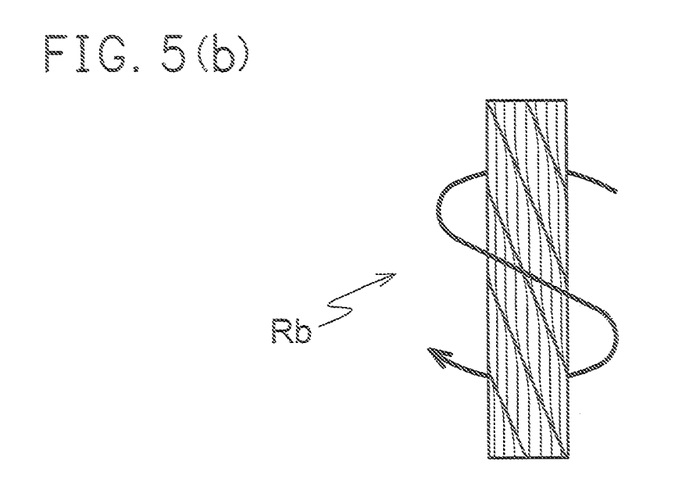

Further, when an angle of the element wires composing the side strand appearing at the outermost lay against the axis line of the inner cable is $-3$ degrees to 3 degrees (namely, normal stranding shown in FIGS. 5(*a*) and 5(*b*)), the elongation rate of an inner cable is improved (hardly elongated), the breaking load of an inner cable is improved (the breaking load is heightened) and load efficiency as a control cable is improved.

It is needless to say for the inner cables 1, 11 and 21, in the same manner as the inner cable of the cited Reference 1, that the tightening percentage which is represented by the percentage of a value which is obtained by dividing a value obtained by subtracting a measured outer diameter being the diameter of the circumscribed circle of the inner cable from a calculated outer diameter being the total sum of the inner cable to a diameter direction of the respective outer diameters of a plurality of element wires, by the measured outer diameter is 4 to 11% and the pre-forming percentage of the side strand which is represented by the percentage of a value which is obtained by dividing the undulating diameter of the side strands when the inner cable is sleeved, by the measured outer diameter of the inner cable is 65 to 90%.

EXAMPLE 1

In the inner cable 11 of FIG. 2, an outer diameter was 1.5 mm, the layer core diameter ds of a side strand 17 was 0.29 mm, the layer core diameter dr of an inner cable was 1.18 mm, the pitch Ps of the side strand 17 was 4.14, the pitch Pi of the inner cable was 16.9, the stranding angle α of the inner cable was 12.3721 degrees and tension P applied to the inner cable was 100 N (refer to Table 1).

As a result of calculation using the fore-mentioned formula, an inner cable torque Tr was $12.94187 \times 10^{-3}$ N·m, the rotation torque ΣTs of a side strand was $2.800516 \times 10^{-3}$ N·m, the rotation torque ΣTs·cosα of a side strand when an inner cable was formed was $2.735479 \times 10^{-3}$ N·m, the rotation torque TR of an inner cable was $10.2064 \times 10^{-3}$ N·m and a rotation coefficient k was 0.068043. Further, an angle of the element wires appearing at the outermost lay against the axis line was $-0.03878$ degree (refer to Table 1).

TABLE 1

|  | Ex. 1 | Ex. 2 | Ex. 3 | Ex. 4 | Com. Ex. 1 |
|---|---|---|---|---|---|
| Outer diameter of rope D (mm) | 1.5 | 1.5 | 1.5 | 1.5 | 1.5 |
| Layer core diameter of side strand ds | 0.29 | 0.29 | 0.29 | 0.29 | 0.29 |
| Layer core diameter of rope dr | 1.18 | 1.18 | 1.18 | 1.18 | 1.18 |
| Side strand pitch Ps | 4.14 | 4.7 | 5.2 | 6 | 5.2 |
| Rope pitch Pi | 16.9 | 20.7 | 21.2 | 27.5 | 12.7 |
| Strand angle of rope $\tan\alpha$ (rad) | 0.219354 | 0.179086 | 0.174862 | 0.134803 | 0.291896 |
| $\alpha$ (rad) | 0.215934 | 0.177207 | 0.173112 | 0.133995 | 0.284005 |
| Strand angle of rope $\alpha$ (degree) | 12.3721 | 10.15324 | 9.918586 | 7.677356 | 16.27231 |
| Tension applied on rope (P) | 100 | 100 | 100 | 100 | 100 |
| $T = P\tan\alpha$ | 21.93538 | 17.9086 | 17.48622 | 13.48029 | 29.1896 |
| $R = dr/2$ | 0.59 | 0.59 | 0.59 | 0.59 | 0.59 |
| Rope torque $Tr = T * R$ | 12.94187 | 10.56607 | 10.31687 | 7.95337 | 17.22186 |
| Stranded angle of strand $\tan\beta$ | 0.220063 | 0.193843 | 0.175204 | 0.151844 | 0.175204 |
| $\beta$ (rad) | 0.216611 | 0.191468 | 0.173444 | 0.150693 | 0.173444 |
| $\beta$ (degree) | 12.41088 | 10.97033 | 9.937598 | 8.634046 | 9.937598 |
| $A = P * 1/\cos B$ | 102.3928 | 101.8614 | 101.5232 | 101.1463 | 101.5232 |
| $T1 = A\tan B/8 * 1/7$ | 0.402373 | 0.352591 | 0.31763 | 0.274257 | 0.31763 |
| $\Sigma Ts$ | 2.800516 | 2.454036 | 2.210707 | 1.908832 | 2.210707 |
| $\Sigma Ts' = \Sigma Ts \cdot \cos\alpha$ | 2.735479 | 2.415606 | 2.177664 | 1.891721 | 2.122148 |
| $TR = Tr - \Sigma Ts' \times 10^{-3}$ (N·m) | 10.2064 | 8.150466 | 8.139207 | 6.061649 | 15.09972 |
| Angle appeared on outermost lay (against axis) | −0.03878 | −0.81709 | −0.01901 | −0.95669 | 6.334717 |
| Rotation coefficient $TR/(P \times D)$ | 0.068043 | 0.054336 | 0.054261 | 0.040411 | 0.100665 |

Consequently, it was grasped that the inner cable of Example 1 has the hardly rotating property.

Figure 6:
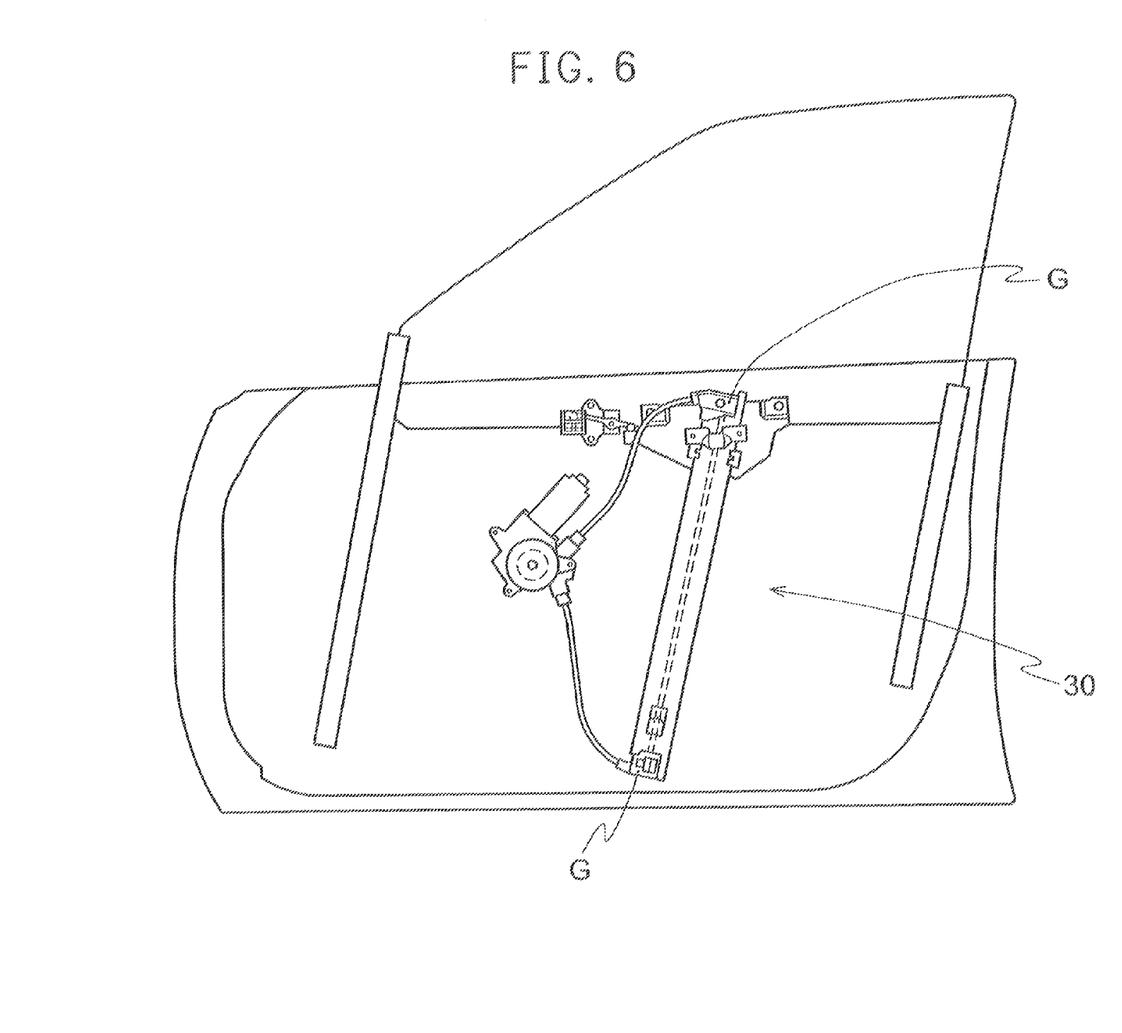
FIG. 6 is an illustration diagram of a window regulator to which the inner cable of the present invention is applied.

Then, the inner cable of Example 1 was applied to a window regulator 30 shown in FIG. 6 and the measurement of actuation sound and vibration was carried out after applying a power voltage of 14.5 V at initial on the window regulator 30, constraining a carrier plate at the joint side of the window regulator 30 and leaving it at atmospheric temperature of 80° C. for 120 hours (after creep test).

The actuation sound was measured in a sound insulating room in which a microphone was provided at a site of 160 mm from a joint to a perpendicular direction under the environment of A characteristic (Fast) of 39.5 dB (dB of the sound insulating room) and the power voltages of the window regulator were 5 V and 9 V, using a noise meter (LA-5111) manufactured by Ono Sokki Co., Ltd.

As a result, sound pressure level at raising a carrier plate was 43.7 dB and sound pressure level at lowering a carrier plate was 44.3 dB at the power voltages of 5 V at initial measurement, and sound pressure level at raising a carrier plate was 44.1 dB and sound pressure level at lowering a carrier plate was 44 dB at a power voltage of 5 V after creep test. Further, sound pressure level at raising a carrier plate was 48.7 dB and sound pressure level at lowering a carrier plate was 49.8 dB at the power voltages of 9 V at initial measurement, and sound pressure level at raising a carrier plate was 48.8 dB and sound pressure level at lowering a carrier plate was 49.9 dB at the power voltages of 9 V after creep test (refer to Table 2).

TABLE 2

| Condition | | Initial | | After creep test | | Difference after evaluation | |
|---|---|---|---|---|---|---|---|
| | | Carrier plate | Carrier plate | Carrier plate | Carrier plate | Carrier plate | Carrier plate |
| Item | Voltage | raised | lowered | raised | lowered | raised | lowered |
| Ex. 1 | 5 V | 43.7 | 44.3 | 44.1 | 44 | 0.4 | −0.3 |
|  | 9 V | 48.7 | 49.8 | 48.8 | 49.9 | 0.1 | 0.1 |
| Com. Ex. 1 | 5 V | 45.1 | 45.8 | 48.8 | 48.8 | 3.7 | 3 |
|  | 9 V | 49.1 | 52.4 | 52.2 | 55.8 | 3.1 | 3.4 |

Vibration was measured at a power voltage of 9 V by attaching a pick-up sensor to the joint portion of a window regulator with an adhesive by using an FFT analyzer manufactured by Ono Sokki Co., Ltd., a pick-up sensor manufactured by Rion Co., Ltd. and a vibration analyzer manufactured by Ono Sokki Co., Ltd.

As a result, vibration was −40.88 dBGr at initial measurement and −19.92 dB after creep test.

Further, as a result of carrying out test by acoustic sense, the generation of abnormal noise was not sensed in raising a carrier plate and at lowering a carrier plate at initial measurement. Further, the generation of abnormal noise was not sensed in raising a carrier plate and at lowering a carrier plate after creep test.

COMPARATIVE EXAMPLE 1

In the inner cable 11 of FIG. 2, an outer diameter was 1.5 mm, the layer core diameter ds of a side strand 17 was 0.29 mm and the layer core diameter dr of an inner cable was 1.18 mm in the similar manner as Example 1 (refer to Table 1).

Further, the pitch Ps of the side strand 17 was 5.2, the pitch Pi of the inner cable was 12.7, the stranding angle α of the inner cable was 16.27231 degrees and tension P applied to the inner cable was 100 N.

As a result of calculation using the fore-mentioned formula, an inner cable torque Tr was $17.22186 \times 10^{-3}$ N·m, the rotation torque ΣTs of a side strand was $2.210707 \times 10^{-3}$ N·m, the rotation torque ΣTs·cosα of a side strand when an inner cable was formed was $2.122148 \times 10^{-3}$ N·m, the rotation torque TR of an inner cable was $15.09972 \times 10^{-3}$ N·m and a rotation coefficient k was 0.100665. Further, an angle of the element wires appearing at the outermost lay against the axis line was 6.334717 degree (refer to Table 1).

Consequently, it was grasped that the inner cable of Comparative Example 1 was rotating property.

Then, the actuation sound and vibration were measured under the same condition as Example 1.

As a result, sound pressure level at raising a carrier plate was 45.1 dB and sound pressure level at lowering a carrier plate was 45.8 dB at the power voltages of 5 V at initial measurement, and sound pressure level at raising a carrier plate was 48.8 dB and sound pressure level at lowering a carrier plate was 48.8 dB at a power voltage of 5 V after creep test. Further, sound pressure level at raising a carrier plate was 49.1 dB and sound pressure level at lowering a carrier plate was 52.4 dB at the power voltages of 9 V at initial measurement, and sound pressure level at raising a carrier plate was 52.2 dB and sound pressure level at lowering a carrier plate was 55.8 dB at the power voltages of 9 V after creep test. The sound pressure level was also the same level after creep test in Example 1, however, the sound pressure level was raised by 3.1 to 3.7 dB in Comparative Example 1.

Vibration was also measured under the same condition as Example 1.

As a result, vibration was −38.96 dBGr at initial measurement and −6.36 dBGr after the creep test. In Example 1, vibration was raised to 20.96 dBGr, however in Comparative Example 1, vibration was raised to 32.6 dBGr.

Further, as a result of carrying out test by acoustic sense, the generation of abnormal noise was not sensed in raising a carrier plate and at lowering a carrier plate at initial measurement, however, the generation of abnormal noise was sensed in raising a carrier plate and at lowering a carrier plate after creep test.

EXAMPLE 2

In the inner cable 11 of FIG. 2, an outer diameter was 1.5 mm, the layer core diameter ds of a side strand 17 was 0.29 mm and the layer core diameter dr of an inner cable was 1.18 mm in the similar manner as Example 1 (refer to Table 1).

Further, the pitch Ps of the side strand 17 was 4.7, the pitch Pi of the inner cable was 20.7, the stranding angle α of the inner cable was 10.15324 degrees and tension P applied to the inner cable was 100 N.

As a result of calculation using the fore-mentioned formula, an inner cable torque Tr was $10.56607 \times 10^{-3}$ N·m, the rotation torque ΣTs of a side strand was $2.454036 \times 10^{-3}$ N·m, the rotation torque ΣTs·cosα of a side strand when an inner cable was formed was $2.415606 \times 10^{-3}$ N·m, the rotation torque TR of an inner cable was $8.150466 \times 10^{-3}$ N·m and a rotation coefficient k was 0.054336. Further, an angle of the element wires appearing at the outermost lay against the axis line was −0.81709 degrees (refer to Table 1).

Consequently, it was grasped that the inner cable of Example 2 was hardly rotating property.

EXAMPLE 3

In the inner cable 11 of FIG. 2, an outer diameter was 1.5 mm, the layer core diameter ds of a side strand 17 was 0.29 mm and the layer core diameter dr of an inner cable was 1.18 mm in the similar manner as Examples 1 and 2 (refer to Table 1).

Further, the pitch Ps of the side strand 17 was 5.2, the pitch Pi of the inner cable was 21.2, the stranding angle, α of the inner cable was 9.918586 degrees and tension P applied to the inner cable was 100 N.

As a result of calculation using the fore-mentioned formula, an inner cable torque Tr was $10.31687 \times 10^{-3}$ N·m, the rotation torque ΣTs of a side strand was $2.210707 \times 10^{-3}$ N·m, the rotation torque ΣTs·cosα of a side strand when an inner cable was formed was $2.177664 \times 10^{-3}$ N·m, the rotation torque TR of an inner cable was $8.139207 \times 10^{-3}$ N·m and a rotation coefficient k was 0.054261. Further, an angle of the element wires appearing at the outermost lay against the axis line was −0.01901 degree (refer to Table 1).

Consequently, it was grasped that the inner cable of Example 3 was hardly rotating property.

EXAMPLE 4

In the inner cable 11 of FIG. 2, an outer diameter was 1.5 mm, the layer core diameter ds of a side strand 17 was 0.29 mm and the layer core diameter dr of an inner cable was 1.18 mm in the similar manner as Examples 1 to 3 (refer to Table 1).

Further, the pitch Ps of the side strand 17 was 6, the pitch Pi of the inner cable was 27.5, the stranding angle α of the inner cable was 7.677356 degrees and tension P applied to the inner cable was 100 N.

As a result of calculation using the fore-mentioned formula, an inner cable torque Tr was $7.95337 \times 10^{-3}$ N·m, the rotation torque ΣTs of a side strand was $1.908832 \times 10^{-3}$ N·m, the rotation torque ΣTs·cosα of a side strand when an inner cable was formed was $1.891721 \times 10^{-3}$ N·m, the rotation torque TR of an inner cable was $6.061649 \times 10^{-3}$ N·m and a rotation coefficient k was 0.040411. Further, an angle of the element wires appearing at the outermost lay against the axis line was −0.95669 degrees (refer to Table 1).

Consequently, it was grasped that the inner cable of Example 4 was hardly rotating property.

Further, Examples 1 to 4 of the present application is a W (19)+8×7 construction, but it is needless to say that similar effect can be also obtained in constructions such as, for example, 7×7, 19+8×7, W (19)+7×7, W (19)+8×7 and W (19)+9×7.

INDUSTRIAL APPLICABILITY

According to the present invention, an inner cable that keeps the durability of a conventional inner cable and has hardly rotating property and a window regulator provided with the inner cable can be provided.

What is claimed is:
1. An inner cable for operation with a complex stranded construction composed by a core strand stranded with a plurality of element wires and a plurality of side strands, each of the plurality of side strands being stranded with the plurality of element wires, wherein a tightening percentage which is represented by a percentage of a value which is obtained by dividing a first value obtained by subtracting a measured outer diameter of a circumscribed circle of the inner cable from a calculated outer diameter being the total sum of the inner cable to a diameter direction of the respective outer diameters of the plurality of element wires, by the measured outer diameter is 4 to 11%, and a pre-forming percentage of the side strand which is represented by the percentage of a second value which is obtained by dividing an undulating diameter of the side strands when the inner cable is sleeved, by the measured outer diameter of the inner cable is 65 to 90%, the side strands are stranded on the core strand so that a stranding length of the inner cable is 11 to 18-fold with respect to the outer diameter of the inner cable, an angle between an axis of one of the element wires located at one of the side strands in an outermost portion of the inner cable and an axis of the inner cable is −3 degrees to 3 degrees, and a torque coefficient k of the inner cable satisfies a relationship of $0.068 \geq k \geq 0.040$, a stranding angle of the inner cable is 8 degrees to 12 degrees, and a rotation torque of the inner cable when a tension applied to the inner cable is 100N is $6 \times 10^{-3}$ N·m to $10 \times 10^{-3}$ N·m.

2. The inner cable for operation according to Claim 1, wherein the stranded construction is a 19+8×7 construction.

3. The inner cable for operation according to Claim 1, wherein the core strand or each of the plurality of side strands is stranded by parallel stranding.

4. The inner cable for operation according to Claim 1, wherein the stranded construction is parallel stranding +8+7 construction.

5. A window regulator equipped with the inner cable for operation according to Claim 1, 2, 3 or 4 and a cable guide, wherein the inner cable slides on the cable guide.

* * * * *